L. GLESENKAMP.
Carriages.

No. 137,914.

Patented April 15, 1873.

Attest:
James McBride

Inventor
Laws Glesenkamp

UNITED STATES PATENT OFFICE.

LOUES GLESENKAMP, OF PITTSBURG, PENNSYLVANIA, ASSIGNOR OF ONE-HALF HIS RIGHT TO COLUMBUS WEST, OF SAME PLACE.

IMPROVEMENT IN CARRIAGES.

Specification forming part of Letters Patent No. 137,914, dated April 15, 1873; application filed February 24, 1873.

*To all whom it may concern:*

Be it known that I, LOUES GLESENKAMP, of the city of Pittsburg, in the State of Pennsylvania, have invented an Improvement in Fronts for Carriage-Bodies, of which the following is a specification:

*Nature and Object.*

My invention relates to that class of pleasure vehicles known as "close carriages," the bodies of which are made with closed sides and ends; and has for its object a more practical and convenient arrangement in the construction of the fronts of such bodies as well as to add to their beauty and elegance. It consists in making the front of the body pentagonal in shape by the peculiar construction of the front and the arrangement of the glass frames, as hereinafter more fully described, and the same in combination with the extended front over the driver's seat.

I am aware that body-fronts have been made in a circular form combined with the extended top or cover of the carriage over the driver's seat. I am also aware that close coaches without extended tops have been made with a three (3) sided front. These modes of construction, however, are subject to certain serious objections, which it is the object of my invention to effectually overcome—viz., in the circular front a pair of corresponding circular heavy glass quarters is required, which, in the first place, are very expensive, and when broken by any accident great inconvenience is experienced in replacing them upon carriages that are used at remote points from the place where made, for the reason that these glasses can be had only at the place where specially made for the purpose; and in a three-sided front too much of a glass surface is presented, and is chiefly applicable to bodies not having extended tops over driver's seat, while in my invention the pentagonal-shaped front not only gives a better support to the extended portion of the top over the driver's seat, and is equally elegant in appearance, but I attain the important advantage of using flat plates of glass, and not only at a much less cost, but when broken may be as readily and cheaply replaced as an ordinary window-pane, and at any location where flat plates of glass may be procured and cut.

Figure 1:
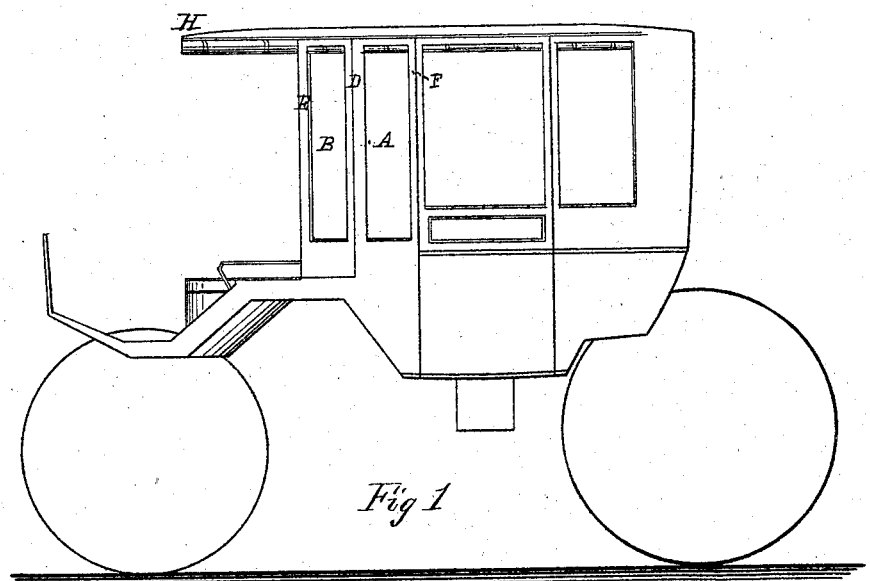
Figure 2:
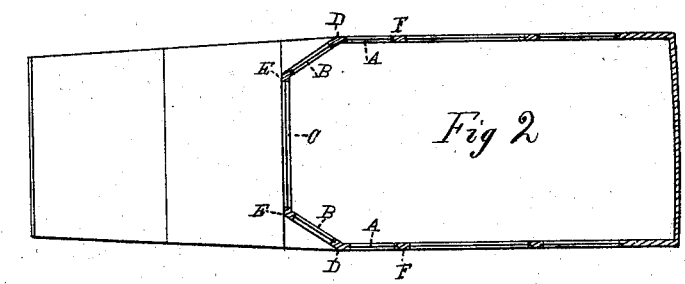

In the drawing, Figure 1 is a side elevation of the body; and Fig. 2 is a plan view of the same in cross-section above the seats.

The body proper may be of any approved style, while the front is framed in the pentagonal shape seen in Fig. 2. On each side is secured the glass A between the pillars D and F, and between the corner-pillars D and E is secured the "pentagonal light" B, while between the pillars E and E is secured the "center light" C. The latter is uniformly put in so as to slide up and down in the frame, as may be required; so likewise the pentagonal lights may, if desirable, be put in so as to be adjusted the same as the center light. The top H is extended over the driver's seat in the usual way, and as shown in the drawing, Fig. 1.

As another modification in the finish of these fronts, a wooden panel may be substituted for the pentagonal light B and painted the same as the other exterior surface of the body, and trimmed on the inside in keeping with the interior of the body.

*Claim.*

I claim as my invention—

In close carriages, the pentagonal front, composed of the parts A, B, C, D, E, and F, in combination with the extended top H, substantially as and for the purpose set forth.

LOUES GLESENKAMP.

Witnesses:
L. W. GLESENKAMP,
COLUMBUS WEST.